L. G. MERKLE.
MILK COOLER.
APPLICATION FILED NOV. 20, 1920.
1,418,957.
Patented June 6, 1922.
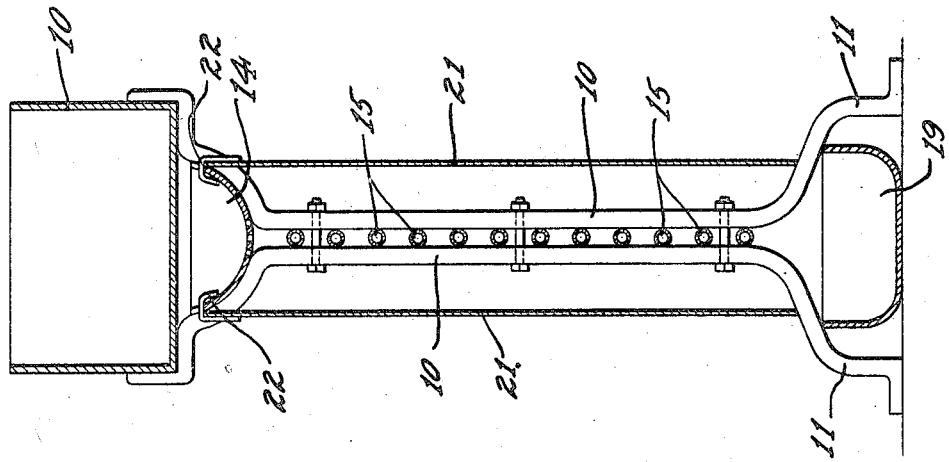
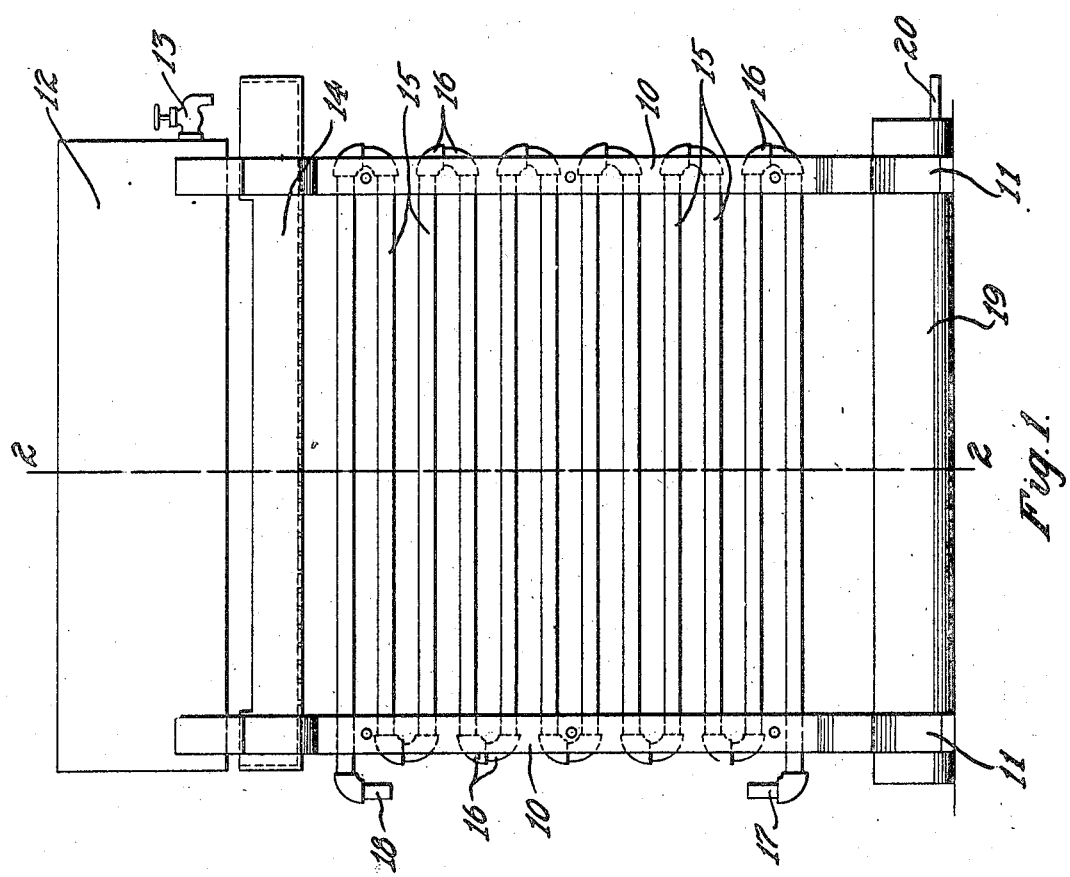

UNITED STATES PATENT OFFICE.

LEON G. MERKLE, OF LINDEN, NEW YORK.

MILK COOLER.

1,418,957.

Specification of Letters Patent. Patented June 6, 1922.

Application filed November 20, 1920. Serial No. 425,495.

*To all whom it may concern:*

Be it known that I, LEON G. MERKLE, a citizen of the United States, residing at Linden, in the county of Genesee and State of New York, have invented new and useful Improvements in Milk Coolers, of which the following is a specification.

This invention relates to dairy devices, particularly to milk coolers, and has for its object the provision of a novel device for aerating and cooling milk in a very rapid and efficient manner whereby the temperature of the milk as it comes from the cow may be reduced to any desired degree so that it will be in proper condition for storage.

An important object is the provision of a device of this character which includes a plurality of horizontally arranged pipes located one above another over which the milk passes, these pipes conducting a cooling fluid which may in actual practice be simply cold water, means of course being provided for preventing splashing of the milk.

An additional object is the provision of a device of this character which will be simple and inexpensive in construction, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of my device with one of the side plates removed, and Figure 2 is a vertical cross sectional view.

Referring more particularly to the drawings, I have shown my device as comprising a pair of uprights 10 which are arranged in spaced relation and which are provided at their lower ends with supporting feet 11. At their upper ends the supports are bifurcated and hold a tank 12 adapted to contain milk. This tank is provided with an outlet cock 13.

Located at the upper ends of the uprights 10 and immediately beneath the tank 12 is a trough 14 having a perforated bottom through which milk is adapted to pass. Secured to the uprights is a pipe coil including horizontally disposed pipe sections 15 arranged in vertically spaced relation and connected at their ends by the usual elbows 16. One end of this coil is provided with an inlet 17 and the other end is provided with an outlet 18 and to the inlet and outlet may be connected a rubber hose or the like leading to a storage tank or force pump by means of which a refrigerating liquid may be circulated through the coil. Disposed below the coil is a receiving trough 19 into which the milk passes and which is provided with an outlet spout 20 adapted to discharge the milk into cans or other suitable receptacles.

In order to avoid splashing of the milk during its descent, I provide side plates 21 which are located on opposite sides of the coil and which carry at their upper ends hooks 22 detachably engageable over the edges of the upper trough 14.

From the foregoing description and a study of the drawings it will be apparent that I have thus provided a simply constructed and consequently inexpensive device by means of which milk may be aerated and cooled in a rapid and efficient manner so that it will be in proper condition for disposition within cans.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A milk cooling device comprising a pair of uprights formed as spaced legs secured together, a vertically disposed coil including a plurality of horizontally superposed convolutions extending between and slightly beyond said uprights and held in clamping engagement between the legs thereof, said coil being adapted for the passage of a refrigerant, the upper ends of the legs forming the uprights being curved upwardly and outwardly and terminating in laterally extending portions having upturned ends, a trough of curved shape mounted upon the curved upper portions of the uprights and having a perforated bottom for discharging milk onto the coil and a tank seating upon the lateral extensions at the upper ends of the uprights and within the confine of said upturned ends and having an outlet spigot discharging into said trough.

In testimony whereof I affix my signature.

LEON G. MERKLE.